US006643719B1

(12) United States Patent
Baker

(10) Patent No.: US 6,643,719 B1
(45) Date of Patent: Nov. 4, 2003

(54) EQUALIZING FIFO BUFFER WITH ADAPTIVE WATERMARK

(75) Inventor: Kevin John Baker, Steyning (GB)

(73) Assignee: Racal Airtech Limited (GB)

( * ) Notice: Subject to any disclaimer, the term of this patent is extended or adjusted under 35 U.S.C. 154(b) by 0 days.

(21) Appl. No.: 09/535,891

(22) Filed: Mar. 27, 2000

(51) Int. Cl.$^7$ .............................. G06F 3/00; G06F 3/023
(52) U.S. Cl. .............................. 710/57; 710/56; 710/33; 710/35
(58) Field of Search .............................. 710/307, 52–57, 710/33–35, 29; 711/111–113

(56) References Cited

U.S. PATENT DOCUMENTS

| 5,210,829 A | | 5/1993 | Bitner |
| 5,506,967 A | * | 4/1996 | Barajas et al. .............. 711/113 |
| 5,974,518 A | | 10/1999 | Nogradi |
| 6,067,408 A | * | 5/2000 | Runaldue et al. .......... 710/307 |

FOREIGN PATENT DOCUMENTS

| WO | PCT/US93/07060 | 2/1994 |
| WO | PCT/US96/19330 | 7/1997 |
| WO | PCT/US96/17585 | 8/1997 |

* cited by examiner

*Primary Examiner*—Jeffrey Gaffin
*Assistant Examiner*—Joshua D Schneider
(74) *Attorney, Agent, or Firm*—Lowe Hauptman Gilman & Berner, LLP

(57) ABSTRACT

Disclosed is a frame processing device (10) for processing frames having a plurality of data bits, a plurality of flag bits and a plurality of zero bits inserted within the data bits to avoid there being a pattern of the data bits which coincide with the pattern of flag bits, the frame processing device (10) comprising a host interface (16) for receiving and transmitting said frames having a first data rate, an encryptor (22) and decryptor (28) for encrypting and decrypting the data bits respectively, a network interface (26) for transmitting and receiving encrypted data bits having a second data rate, and an adaptive first-in first out (FIFO) buffers (22 and 30) for compensating for the difference between said first data rate and second data rate.

16 Claims, 1 Drawing Sheet

EQUALIZING FIFO BUFFER WITH ADAPTIVE WATERMARK

FIELD OF THE INVENTION

The invention relates to First-in, First-out (FIFO) devices and queuing schemes for data communication systems using frames of data.

BACKGROUND OF THE INVENTION

Frame Relay (FR) networks route FR frames, using a plurality of frame-relay frame handlers, from one terminal equipment station to another. The FR frame structure is defined by American National Standards Institute (ANSI) Standard T1.618. Based on the High-level Data Link Control (HDLC) protocol, frame relay frames are delimited by one or more flags. To avoid data being incorrectly interpreted as a flag, frames of data are "stuffed" prior to transmission using a zero bit insertion algorithm. More specifically, data in FR frames are transported using the following standard HDLC framing:

<flag><data><crc><flag> where
<flag> is the bit sequence 01111110,
<data> is the frame payload (not restricted to just exactly byte sized data—the data may for example be 25 bits long).
<crc> is the 16 bit cyclic redundant check (CRC) character of the <data> section.

Should the bit sequence 01111110 appear in the data stream, it would be incorrectly interpreted as a flag sequence. To overcome this, every time the sequence 11111 appears in the data, an extra '0' is inserted ('stuffed') into the data stream, i.e., it is replaced with 111110. On reception the converse occurs—the sequence 111110 is replaced with 11111 ('de-stuffed') after the flag detection logic. Consequently, the 8 bit sequence 01111110 in the data would be transmitted as a 9 bit sequence 011111010.

This bit stuffing has significant impact on the rate which data can be transmitted. Take for example two different data frames of 256 bytes. One contains all zeros, and the other contains all 1's. The frame containing all zeroes will have no bit stuffing applied (as the sequence 11111 will not occur, except maybe in the CRC), and the entire frame will be (256 * 8)+32=2080 bits. The frame containing all 1's will have an extra 0 inserted every 5 data bits, and the entire frame will therefore be (256 * 8)+((256 * 8)/5)+32=2489 bits. Given the line bit rate is fixed, the all 1's frame will take almost 20% longer to transmit.

For in-line frame relay equipment, the data is received on one port and transmitted on another. In such equipment, when the frames are simply transferred from the receiver to the transmitter (i.e., in plaintext bypass conditions), this variability in the effective transmission rate has no major impact. In other words, for a given item of data, the level of bit stuffing on the receiver and transmitter will match. However, when the data is modified, the level of bit stuffing for the receiver and transmitter may be different. For example, when data is encrypted, the encrypted data is essentially random (The data bits 0/1 distribution is statistically identical to the head/tail results from tossing a coin many times). This has the effect that with the above-mentioned, illustrative 256 byte frame, when encrypted, has generally between 30 & 40 stuffing bits inserted (i.e., 2110 to 2120 bits in the total frame size), regardless of the number of stuffing bits that were present in the unencrypted data.

Although frame relay (and most other systems using HDLC framing) do not support payloads that are not exact bytes in size, the HDLC standard is designed to cope with this possibility. Therefore, the flag bit-stuffing mechanism operates on every bit in the data stream, not just at the byte boundaries.

Commercially available products, such as the product identified by the trademark "DC2K-FR" and manufactured by Racal-Airtech Limited, a U.K. company, "destuff" each frame (i.e., removes the zero bits added by the stuffing process), transform it (e.g., by encryption—when required) and re-stuff it before transmitting. Since the data being re-stuffed has been transformed, it may have very different statistical characteristics to the original frame, and a different number of bits may be added by the restuffing process than were removed during the destuffing process, causing the unit's input and output data rates to be different.

In these commercially available products, an "equalizing" First-in First-out device (FIFO) is used to minimise the loss and corruption of frames due to this effect. In the equalizing FIFO, the next byte to be retrieved is the byte that has been in the queue for the longest time. The equalizing FIFO used is fairly large, having to cope with potentially very different input and output data rates. Encrypted data is essentially random, whereas the input data that is destuffed can be highly formatted (Word documents, for example, have a large number of 1's in their binary image, requiring a relatively large amount of de-stuffing).

With respect to the above referenced DC2K-FR encryption unit, the equalizing FIFO is used in the following manner. The length of the FIFO used is 512 bytes, and a "watermark" typically, for example, is set at 90 bytes to allow for an underrun (where data transmitted has less stuffing than that received) of up to 90 bytes, or an overrun (where data received has less stuffing than that transmitted) of up to 512−90=422 bytes. The frames coming into the encryption unit are not passed out of the encryption unit until either at least 90 bytes of the frame have been received by the equalizing FIFO, or the entire frame has been received, causing a (non-cumulative) latency in data output. Other features of this design (the encryption algorithm for example) also cause some degree of latency, giving rise to a total latency of approximately 15 plus minimum (90 bytes or length of frame in bytes).

As implemented in this prior art design, the watermark is calculated to avoid an underrun for a given maximum size data frame. For example, to allow a 1500 byte frame, the watermark would need to be set to at least 275 bytes. More specifically, this watermark value can be calculated as follows. The worst case situation is for this 1500 byte frame, as received by the FIFO, to have all ones, which will lead to the frame being bit stuffed at the rate one stuffing bit per 5 data bits (20%), giving a total frame length of 1800 bytes (=1500 * 1.2) on the receive side of the FIFO. On encrypted data, the stuffing rate is around 1 bit per 60 data bits (1.7%), giving a total frame length of 1525 bytes (=1500 * 1.017) on the transmit side. The watermark in the FIFO must be set so that the frame will have finished being received before it has finished being retransmitted; hence, the watermark must be at least 275 (1800–1525) bytes. This approach has a number of problems, as described below:

1. The system ends up with an artificially large latency on all but small frames.
2. The amount of FIFO space available to handle overrun conditions is reduced.
3. There is no mechanism to handle larger highly stuffed frames.

SUMMARY OF THE INVENTION

The invention is directed toward a method of buffering received frames of data bits comprising the steps of inputting the data bits into a first-in first-out buffer at a first data rate; outputting the data bits from the buffer at a second data rate when a complete frame of the data bits has been received by the buffer or the amount of the data bits received by the buffer reaches a watermark, detecting when the buffer has an underrun condition or an overrun condition, wherein the improvement is characterised by the following steps of increasing the watermark by a first predetermined amount when the underrun condition is detected; and decreasing the watermark by a second predetermined amount when the overrun condition is detected.

The invention is also directed to a frame processing device for processing received frames of data bits comprising means for receiving the data bits with a first data rate; data manipulation means being operable for changing the amount of the data bits; means for transmitting the data bits with a second data rate; first-in first-out (FIFO) buffer means for compensating for a rate difference between the first data rate and the second data rate; and the FIFO buffer means including output means for outputting the data bits from the FIFO buffer means when a complete frame of the data bits has been received by the FIFO buffer means or amount of the data bits received by the FIFO buffer reaches a watermark and detection means for detection when the FIFO has an underrun condition or an overrun condition, wherein the improvement is characterised by the FIFO buffer means including underrun means for increasing the watermark by a first predetermined amount when the detection means detects the underrun condition; and the FIFO buffer means including overrun means for decreasing the watermark by a second predetermined amount when the detection means detects the overrun condition.

The features of the invention believed to be novel are set forth with particularity in the appended claims. The invention itself, however, both as to organization and method of operation, together with further objects and advantages thereof, may be best understood by reference to the following description taken in conjunction with the accompanying drawing.

DETAILED DESCRIPTION OF THE PREFERRED EMBODIMENT

Figure 1:
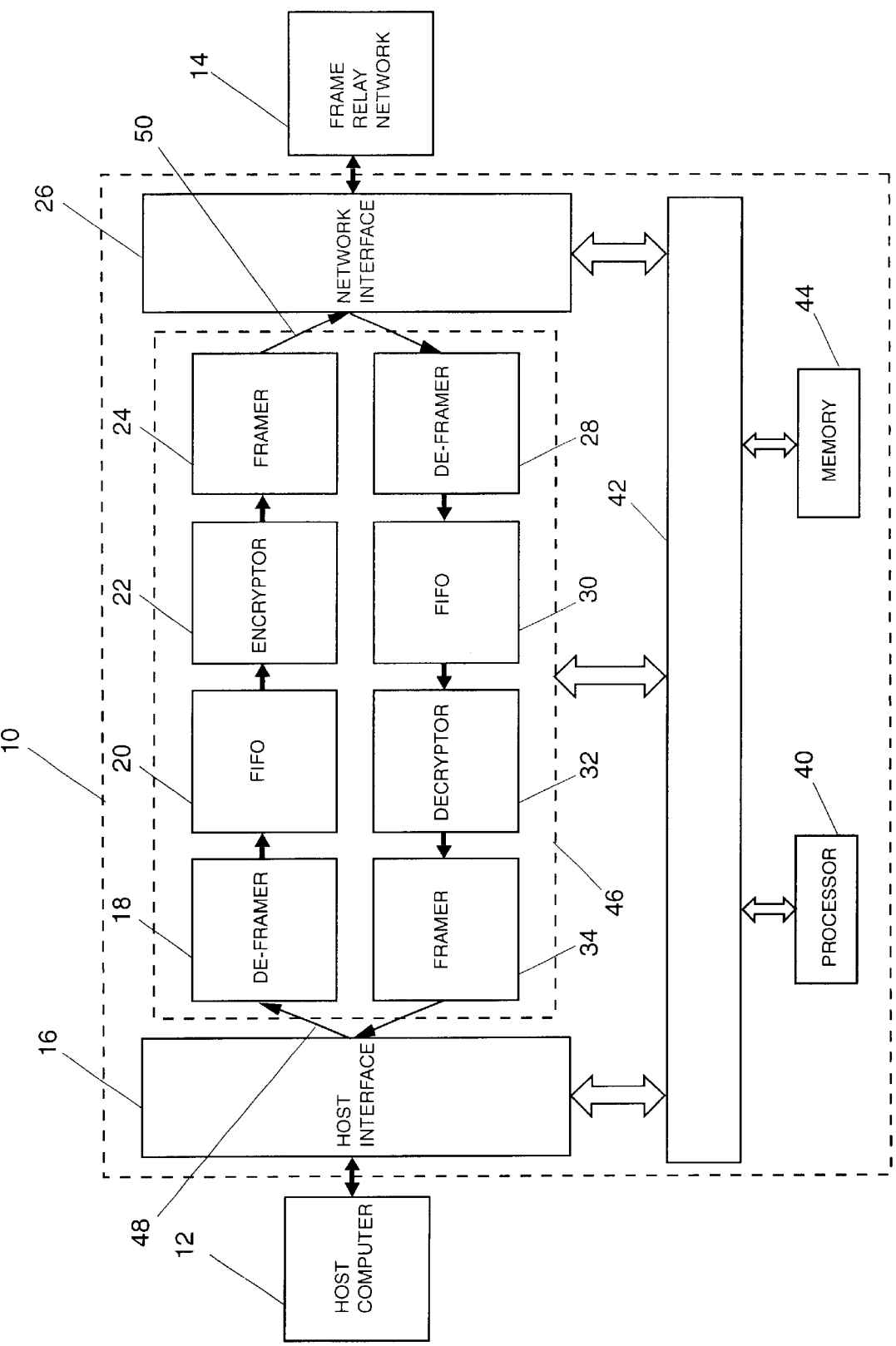
FIG. 1 is a generalised block diagram of the frame processing device of the present invention.

Referring to FIG. 1, a data frame device 10 is shown connected to a host computer 12 or like source of data and preferably, but not necessarily, a frame relay network 14. In the preferred embodiment the frame processing device 10 comprises an encryption unit. However, as will be discussed hereinafter, there are applications other than cryptography wherein the present invention may be used and encryption/decyption is merely illustrative of one such application. Likewise, although the preferred embodiment of the present invention is shown implemented with the frame relay network 14, the present invention can be used with other data networks wherein the input and output data rates the data frames vary.

In a conventional manner, the frame processing device 10 receives plaintext data from the host computer 12, encrypts data, and transmits the encrypted data in Frame Relay (FR) frames over the frame relay network 14 to another FR terminal station (not shown). Likewise, in a conventional manner, the frame processing device 10 decrypts encrypted data received from another terminal station (not shown) over the frame relay network 14, to obtain the data from such terminal station and provides such data in the properly framed format to the host computer 12. This process is described in detail below.

Continuing to refer to FIG. 1, the data from the host computer 12 is provided in HDLC formatted, FR frames to a host interface 16. The host interface 16 provides such data to a first de-framer 18. The de-framer 18 extracts and checks the HDLC framed data. More specifically, in a conventional manner the de-framer 18 performs HDLC flag detection, bit de-stuffing using the well known zero bit insertion algorithm described in the Background Section and CRC checking. However, the de-framer 18 does not remove all the framing information. The output of the de-framer 18 is a data-stream of 9 bit values, with each 9 bit being one of the following:

a) a data byte—i.e. part of a frame, b) an end of frame flag (Also contains info on CRC correctness etc.), or c) an 'idle' marker.

For example, if 3 frames are received, with a small gap between the first and second, but the third immediately following the second, the following data stream of these 9 bit values will be produced by the de-framer 18 as provided below:

ii1111Fiiiii22222F3333Fiii where:
 i=idle marker
 F=end of frame marker
 1,2,3=frame data contents.

The de-framer 18 inserts the extracted data frames into a first FIFO 20. The FIFO 20 provides a buffer to handle the difference in the data rates of the received data frames from the de-framer 18 and of the transmitted data frames extracted from the FIFO 20, such difference in rates for this illustrative encryption application being described in the Background Section. Hence, buffered, plaintext data content is temporarily stored in the FIFO 20. Upon the data content being extracted from the FIFO 20, the plaintext data content is provided to an encryptor 22 wherein standard encryption is undertaken on the data content of the data frames. In the preferred embodiment triple-DES 8 bit cipher feedback encryption is used, but any type of encryption may be used with the present invention and this is merely illustrative of one example of encryption. With the use of the cipher feedback mode of the DES algorithm, user data is encrypted/decrypted on a byte-by-byte basis—each new byte of plaintext can be used to create the next byte of ciphertext. The frames with encrypted data are then passed through the encryptor 22 to a first framer 24, wherein the data is again placed into HDLC frames, but this time with the data content being in encrypted form instead of plaintext form. The first framer 24 performs the inverse operation to the de-framer 18 described above and, as discussed hereinafter, controls the rate at which bytes of the data content are extracted from the FIFO 20 and provided to the encryptor 22. This extraction rate from the FIFO 20 typically is at a different rate than bytes are inserted into the FIFO 20 by the de-framer 18. Thereafter, the FR frames, which include the encrypted data, are passed onto a FR network interface 26, which in turn provides the FR frames to the frame relay network 14.

As can be seen from FIG. 1, the inverse process is performed for FR frames received from the frame relay network 14. More specifically, the FR frames are received by the network interface 26 and passed on to a second de-framer 28, where, like the first de-framer 18, the HDLC framed data is extracted and checked by performing HDLC flag detection, bit de-stuffing and CRC checking. The extracted, still framed data is passed on to a second FIFO 30, again to provide a buffer for the difference between the received and transmit data rates. The buffered data is provided to a decryptor 32 wherein the plaintext data is derived from the encrypted data. Thereafter, the plaintext data is passed on to a second framer 34 and in the second framer 34 the data is again reframed into HDLC formatted, FR frames, but this time with the data content being in non-encrypted, plaintext form. Thereafter, the FR frames are received by the host interface 16 for transmission to the host computer 12.

Referring to FIG. 1, the operation of the FIFO 20 will now be discussed in more detail. The FIFO 20 has 2 ports, and input port connected to the de-framer 18 and an output port connected to the encryptor 22. A data byte/flag is written to the input port of FIFO 20 by the de-framer 18 when required, and a data byte/flag is sent from the output port of FIFO 20 by the framer 24 when required. The other blocks in the chain including blocks 16, 24 and 26 in FIG. 1 are timed by the de-framer 18 or framer 24, and so that they do not affect the timing FIFO 20's operation. More specifically, the encryptor 22 is placed between the FIFO 20 and the framer 24, but is 'transparent' as far as the timing goes—data shuffles out of the FIFO 20 byte-by-byte, through the encryptor 22 into the framer 24 as and when requested by the framer 24. In other words, the encryptor 22 appear as a fixed-delay pipeline. Therefore, we have two basic operations, an insert into the FIFO 20 (triggered by a write-request from the de-framer 18), and an extract out of the FIFO 20 (triggered by a read request from the framer 24). To the extent described, this is a conventional operation of the FIFO 20.

Referring to FIG. 1, at this point the previously described "underrun" and "overrun" problem will be described in more detail. First, it should be noted that the actual line rate (bits per second) of the FR frames received by the host interface 16 and the line rate (bits per second) of the FR frames transmitted by the network interface 26 are the same. Likewise, with the reverse path, the actual line rate of the FR frames received by the network interface 26 and transmitted by the host interface 16 are the same. Hence, as described in the Background Section, the amount of zero stuffing impacts the efficiency of the transmission of the data in a number of applications known to those skilled in the art, including but not limited to, encryption and decryption of the extracted data.

In the preferred embodiment of the frame processing device 10, the illustrative application which may create the above-described differences in data rates is encryption and decryption. With respect to data transfers from the host interface 16 to the network interface 26, the efficiency rates may differ as described below:

1. Underrun. If the received data has a higher level of stuffing than the transmitted data, data is being received at a lower effective rate than it is being transmitted. This occurs, for example in the encryption process undertaken by the encryptor 22, where the received data from the host interface 16 is plaintext and has a high number of stuffing bits, and the transmitted data from the network interface 26 is ciphertext and has an 'average' number of stuffing bits.

2. Overrun. If the received data from the host interface 16 has a lower level of stuffing than the transmitted data from the network interface 26, data is being received at a higher effective rate than it is being transmitted. This will occur, for example, with the encryption process undertaken by encryptor 22, when the received data is plaintext and has a low number of stuffing bits, and the transmitted data is ciphertext and has an 'average' number of stuffing bits.

With respect to data transfers in the opposite direction from the network interface 26 to host interface 16, the efficiency rates may differ as described below:

1. Overrun. If the received data from the network interface 26 has a lower level of stuffing than the transmitted data from the host interface 16, data is being transmitted at a lower effective rate than it is being received. This occurs, for example in the decryption process undertaken by decryptor 32, in the case where the received data from the network interface 26 is ciphertext and has an average number of stuffing bits, and the transmitted data from the host interface 16 is plaintext and has a high number of stuffing bits.

2. Underrun. If the received data from the network interface 26 has a higher level of stuffing than the transmitted data from the host interface 16, data is being received at a lower effective rate than it can be transmitted. This will occur, for example in the decryption process undertaken by decryptor 32, when the received data is ciphertext and has an average number of stuffing bits, and the transmitted data is plaintext and has a low number of stuffing bits.

As can be seen from the above discussion, in actual usage of the frame processing device 10, the level of stuffing on the plaintext is indeterminate—it may be high or low depending on the application software that is generating the data. Hence, all possibilities must be taken in account in the design of the FIFO's 20 and 30. In summary, with the input and output line rates (bits per second) of the FR frames being equal, the amount of customer data included in the frames decreases as the number of inserted zeros increases and vice versa.

To handle the above-described overruns and underruns, the FIFO's 20 and 30 are introduced into the frame processing device 10 with use of a watermark. In a conventional manner, the framed data content in the FIFO 20 cannot be transmitted until either a complete frame of data has been received by the FIFO 20 or until the number of bytes received by the FIFO 20 equals the watermark, whichever is less.

In Table 1 below, a simplified example is given to illustrate the conventional operation of this watermark for the FIFO's 20 and 30. In this example, a very small FIFO will be assumed, with a watermark of four. It will also be assumed that two data frames are received, one frame being a single byte long, the other frame being 5 bytes long. In the example of Table 1, assuming an initially empty FIFO, a frame is only be delayed by either the frame length or the watermark, whichever is smaller.

(Note F=Frame end)

TABLE 1

| Operation | Input | FIFO contents (After operation) | Output | Comments |
|---|---|---|---|---|
| Insert | idle | Empty | | Insert of an idle character has no effect |
| Extract | | Empty | idle | Extract on empty FIFO has no effect. |
| Insert | 1 | 1 | | |
| Extract | | 1 | idle | FIFO has not reached watermark or whole frame condition, so no output. |
| Insert | F | F1 | | |
| Extract | | F | 1 | A whole frame is in FIFO, so output can commence. |
| Insert | 2 | 2F | | 2$^{nd}$ frame is now being received. |
| Extract | | 2 | F | First frame is still being output. |
| Insert | 3 | 32 | | |
| Extract | | 32 | idle | FIFO has not reached watermark or whole frame condition, so no output. |
| Insert | 4 | 432 | | |
| Insert | 5 | 5432 | | Example of what happens when input rate > output rate. |
| Extract | | 543 | 2 | FIFO has reached watermark, so frame output is started. |
| Extract | | 54 | 3 | Output rate > input rate. |
| Insert | 6 | 654 | | |
| Extract | | 65 | 4 | |
| Insert | | F65 | | whole frame is now in FIFO |
| Extract | | F6 | 5 | |
| Insert | idle | F6 | | |
| Extract | | F | 6 | |
| Insert | idle | F | | |
| Extract | | Empty | F | 2$^{nd}$ frame now transmitted. |

In Table 2, a simplified animation of the above-described underrun wherein such underrun leads to an "underrun condition", wherein the output of a frame is terminated due to the FIFO being empty when there is an attempt to extract the remainder of the frame. The difference between input and output data rates has been exaggerated to avoid the animation having to be many pages long. In the example below, when the FIFO reaches the underrun condition, the output frame is terminated with an error marker. This causes the framer 24 to abort the current frame and an error message is logged by the processor.

TABLE 2

| Operation | Input | FIFO contents (After operation) | Output | Comments |
|---|---|---|---|---|
| Insert | 1 | 1 | | |
| Insert | 2 | 21 | | |
| Insert | 3 | 321 | | |
| Insert | 4 | 4321 | | Watermark reached - output can now commence |
| Extract | | 432 | 1 | Output rate > input rate |
| Extract | | 43 | 2 | |
| Extract | | 4 | 3 | |
| Insert | 5 | 54 | | |
| Extract | | 5 | 4 | |
| Extract | | Empty | 5 | |
| Insert | 6 | 6 | | |
| Extract | | Empty | 6 | |
| Extract | | Empty | Error marker | FIFO has underrun condition. Output frame is terminated with an error marker. |
| Insert | 7 | Empty | | Input is discarded up to next end of frame |
| Extract | | Empty | idle | |
| Insert | F | Empty | | Frame end has been received - normal operation commences |
| Extract | | Empty | idle | |
| Insert | 1 | 1 | | New frame now being received. |

In Table 3 below there is provided an animation of an overrun wherein such overrun creates an "overrun condition", wherein there is no more room to insert another byte into the FIFO 20 because it is completely full. This overrun condition is illustrated by assuming a very short 8 byte entry FIFO and the difference between input and output data rates has again been exaggerated to avoid the animation being many pages long. This overrun condition results in the data in the FIFO 20 being discarded until another frame is received. The framer 24 aborts the current frame and an error is logged by the processor.

TABLE 3

| Operation | Input | FIFO contents (After operation) | Output | Comments |
|---|---|---|---|---|
| Insert | 1 | 1 | | |
| Insert | 2 | 21 | | |
| Insert | 3 | 321 | | |
| Insert | 4 | 4321 | | Watermark reached - output can now commence |
| Extract | | 432 | 1 | Output rate < input rate |
| Insert | 5 | 5432 | | |
| Insert | 6 | 65432 | | |
| Insert | 7 | 765432 | | |
| Insert | 8 | 8765432 | | |
| Insert | 9 | 98765432 | | |
| Extract | | 9876543 | 2 | |
| Insert | 0 | 09876543 | | |
| Insert | A | Empty | | FIFO has overrun - input data discarded until next frame end. |
| Insert | B | Empty | | |
| Extract | | Empty | Error marker | Output frame is terminated with an error marker |
| Insert | C | Empty | | Input is discarded up to next end of frame |
| Extract | | Empty | idle | |
| Insert | F | Empty | | Frame end has been received - normal operation re-commences |

TABLE 3-continued

| Operation | Input | FIFO contents (After operation) | Output | Comments |
|---|---|---|---|---|
| Extract | | Empty | idle | |
| Insert | 1 | 1 | | New frame now being received. |

In the actual implementation of the FIFOs in the preferred embodiment, the length of each FIFO 20 or 30 is 512 bytes. Again, to handle an underrun, each FIFO 20 or 30 does not start to output a frame until either a complete frame has been received (i.e., an underrun cannot occur in this case, by definition), or a given number of bytes (the watermark) have been received. To the extent described to this point, the operation of the FIFO's and their watermarks are of conventional design.

In accordance with the present invention, to minimise the latency through the frame processing device 10 and to avoid the problems discussed in the Background Section, the equalizing FIFO's 20 and 30 were designed to be adaptive, depending on the data received. As with the prior art design, in one implementation the watermark in the FIFO's 20 and 30 are initially set at 90 bytes, but in the present invention: (1) if the FIFO 20 or 30 overruns, watermark is reduced by 32 bytes and (2) if the FIFO 20 or 30 underruns, the watermark is increased by 32 bytes. In this way, the frame loss is minimised while keeping the latency as low as possible by adapting to a desirable watermark, such latency being approximately 15 plus a minimum consisting of the current watermark or length of frame, which ever is shorter. Although the amount of adjustment for an overrun condition and an underrun condition is the same in the preferred implementation, those skilled in the art will recognise that for some applications it may be desirable to use different values.

In addition to the above described increase or decease of the watermark by 32 bytes triggered by the happening of the underrun and overrun conditions respectively, the adaption process also is assisted by implementing the following additional adjustment to the watermark in the event that the underrun condition does not occur within a predetermined amount of time. If the FIFO 20 or 30 has not incurred an underrun condition in the last one second period of time, the watermark is reduced by 32 bytes but maintained within limits that minimise frame loss. This avoids having the watermark remaining at too high of a value when it is no longer needed. Generally, the value of these downward adjustments (32 bytes) of the watermark caused by the underrun condition not happening is the same as downward adjustments (32 bytes) of the watermark that occur when an overrun condition occurs. However, those skilled in the art will recognize that such adjustments can differ in magnitude. Should an underrun condition occur, the frame will be discarded, and the watermark is raised by a predetermined increment (32 bytes). In a conventional manner, the loss of the frame will be detected by a higher level protocol (such as TCP/IP), and the frame will be resent. This process will repeat until the watermark is sufficiently high to allow the frame to pass through the frame processing device 10. Conversely, should an overrun condition occur, frames will be discarded, and the watermark is lowered by the predetermined increment (32 bytes).

Alternatively, the watermark of the adaptive FIFO 20 or 30 may be initially set to a significantly lower value than required for the worst case condition (significantly lower than 90 bytes), which leaves the immediate possibility of an underrun condition. This may allow the watermark to adapt to a lower watermark quicker, but this quicker adaption may come at the cost of discarding more frames.

Without adaption, the watermark has to be set to a sufficiently high value that an underrun condition will not occur (E.g. >275 bytes for 1500 byte frames). If the system is not using 1500 byte frames in this example, or they are not highly stuffed, the 275 byte delay is being unnecessarily imposed, causing longer than necessary delays on frames and less headroom in the FIFO's 20 and 30.

With adaption, a much lower watermark value can be achieved. This lower watermark means frames pass through the device 10 with less delay, and the FIFO has more headroom available to handle overrun conditions. Occasional frames that need a higher watermark may be received, and they will get discarded. However, at this time we also move the watermark up a bit, and the higher level protocol, e.g., TCP/IP, will resend the frame. This continues until the watermark is sufficiently high to allow the frame through without underrun condition.

It is contemplated that the present invention can be used with applications other than encryption wherein the input and output rate rates differ in a variable manner, such as with data compression. With compression, it is almost certain that the link data rates will be different on either side of the device. Compression and encryption applications fall into one set of applications for which the present invention is applicable, such set including those applications wherein the payload or data received by frame processing device 10 must be transmitted at a different rate from which it is received. However, it also is possible that in some applications, the frame processing device 10 may insert or remove additional control characters or like non-payload information in a variable manner in which the adaptive FIFO of the present invention could be of use.

Although the encryption application of the preferred embodiment is shown to process FR frames, the present invention can be used with any data communications service having frames which are delineated by flags requiring the use of the zero bit insertion algorithm. For example, the network interface 26 and the host interface 16 may take many different forms, including, but not limited to, interfaces complaint with the following standards: ITU V.24 (RS-232), X.21 and V.35. Such interfaces may also consist of E1 or T1 line drivers. For example, it will be obvious to those skilled in the art that the present invention may be used with any network service involving frames or packets of data delineated by flags (X.25 systems).

Although the FIFO's 20 and 30 receive and output frames of bytes of data, data in a frame may take forms other than bytes. Hence, in the claims, the frames will merely be referred to as frames of data bits, but this intended to cover data received/outputted on a bit basis, a byte basis or any other units defining a group of bits.

Referring to FIG. 1, in a conventional manner, the frame processing device 10 includes a standard microprocessor (i.e., Motorola MCF5206—Coldfire) 40 which has a bus interface and memory decode; a conventional system bus 42 (i.e., a data bus, an address bus and a control bus) connected to the microprocessor 40; and volatile and non-volatile memories generally shown by memory block 44, connected to the system bus 42. The memory block 44 includes DRAM (4M), flash (1M) and non-volatile SRAM (256K). In the preferred embodiment, with the exception of the host and network interfaces 16 and 26, processor 40, memory block 44 and system bus 42, all the blocks shown in FIG. 1 are implemented in a single Field Programmable Gate (FPGA) 46. The FPGA 46 is Virtex 100 or 300, manufactured by Xilinx, Inc., which is a symmetrical array FPGA that makes use of Static RAM programmable connections.

In a conventional manner, the FPGA 46 is a memory mapped peripheral to the microprocessor 40, but the link datapaths 48 and 50 to the host interface 16 and network interface 26, respectively, are directly connected to the FPGA 46 and do not connect via the microprocessor 40. In a conventional manner, during the digital design stage, a digital design is created using a Hardware Description Language (VHDL) which is synthesised into a "netlist. Thereafter, during the implementation stage, place and route tools supplied by Xilinx, Inc. convert the netlist into switch settings to configure the FPGA 46. The switch settings are held in a "bitstream" file where each bit corresponds to one switch in a hardware configuration (0=off, 132 on). In the configuration of the FPGA 46, this bitstream file (circuit design) is downloaded from memory 44 into the FPGA 46 by software executed by the microprocessor 40. Otherwise, the microprocessor 40 only has relevancy to the FIFO's 20 and 30 for executing software to provide a once-a-second timing pulse to the FIFO's, which is used to time the float-down of the FIFOs' watermark, as such (relatively) long times are more flexibly handled by software. In the specific application illustrated in the preferred embodiment, the microprocessor 40 also is used to perform a number of higher level system functions such as key exchange, configuration and SNMP statistics gathering and reporting, all of which are not part of the present invention.

In this well known FPGA design approach, the presence of the FPGA 46 in the middle of the datapath allows for the frame processing device 10 to do a very wide range of functions, such as line encryption, with the ability to readily change encryption algorithms. In other words, the FPGA 46 can be programmed an unlimited number of times to do a range of functions. It should be understood that although two FIFO's are shown, those skilled in the art can implement the present invention using only one FIFO.

The present invention may be implemented in a number of ways, as will be clear to those skilled in the art. Of course, those skilled in the art will appreciate that while this arrangement is preferred, it is not intended to be limiting as other arrangements of the frame are possible.

What is claimed is:

1. A method of buffering received frames of data bits comprising:

inputting the data bits into a first-in first-out buffer at a first data rate;

outputting the data bits from the buffer at a second data rate when a complete frame of the data bits has been received by the buffer or the amount of the data bits received by the buffer reaches a watermark;

detecting when the buffer has an underrun condition or an overrun condition;

detecting when the buffer has an underrun condition or an overrun condition;

increasing the watermark by a first predetermined amount when the underrun condition is detected;

decreasing the watermark by a second predetermined amount when the overrun condition is detected; and monitoring the buffer for a predetermined period of time to determine whether the underrun condition occurs during the predetermined period of time and decreasing the watermark by a third predetermined amount upon not detecting the underrun condition during the predetermined time period.

2. A method in accordance with claim 1 wherein the first, second and third predetermined amounts are substantially the same.

3. A method in accordance with claim 1 further including the step of initially setting the watermark at a level wherein said underrun condition is possible.

4. A frame processing device for processing received frames of data bits comprising means for receiving said data bits with a first data rate; data manipulation means being operable for changing the amount of said data bits; means for transmitting said data bits with a second data rate; first-in first-out (FIFO) buffer means for compensating for a rate difference between said first data rate and said second data rate; and said FIFO buffer means including output means for outputting said data bits from said FIFO buffer means when a complete frame of said data bits has been received by said FIFO buffer means or amount of said data bits received by said FIFO buffer reaches a watermark and detection means for detection when said FIFO has an underrun condition of an overrun condition, wherein the improvement is characterized by:

said FIFO buffer means including underrun means for increasing said watermark by a first predetermined amount when said detection means detects said underrun condition;

said FIFO buffer means including overrun means for decreasing said watermark by a second predetermined amount when said detection means detects said overrun condition; and said FIFO buffer means includes watermark adjustment means for decreasing said watermark by a third predetermined amount upon said detection means not detecting an underrun condition during a predetermined time period.

5. A frame processing device in accordance with claim 4 wherein said first, second and third predetermined amounts are substantially the same.

6. A frame processing device in accordance with claim 4, wherein said FIFO buffer means includes setting means for initially setting said watermark at a level wherein said underrun condition is possible.

7. A frame processing device in accordance with claim 4, wherein said FIFO buffer means includes means for discarding at least a portion of said data bits in said FIFO buffer means when said overrun condition occurs.

8. A frame processing device in accordance with claim 4, wherein said data manipulation means includes an encryptor.

9. A frame processing device in accordance with claim 4, wherein said received frames includes at least plaintext data bits, a plurality of first flag bits and a plurality of inserted first zero bits within said plaintext data bits to avoid there being a sequence of said plaintext data bits coinciding with a sequence of said first flag bits; and said data manipulation means includes:

- a deframer for removing at least said first zero bits from said plaintext data and said first flag bits;
- an encryptor for encrypting said plaintext data bits to provide a plurality of encrypted data bits; and
- a framer for placing said encrypted data bits into a plurality of transmit frames, said transmit frames also including a plurality of second flag bits and a plurality of second zero bits inserted within said encrypted data bits to avoid there being a sequence of said encrypted data bits coinciding with a sequence of said second flag bits.

10. A frame processing device in accordance with claim 9, wherein said means for receiving said data bits with a first data rate includes a host interface and said means for transmitting said data bits with a second data rate includes a network interface.

11. A frame processing device in accordance with claim 10, wherein said received frames and said transmit frames comprise frame relay frames.

12. A frame processing device in accordance with claim 4, wherein said received frames includes at least encrypted data bits, a plurality of first flag bits and a plurality of inserted first zero bits within said encrypted data bits to avoid there being a sequence of said encrypted data bits coinciding with a sequence of said first flag bits; and said data manipulation means includes:

- a de-framer for at least removing said first zero bits from said encrypted data bits and said first flag bits;
- a decryptor for decrypting said encrypted data bits to provide a plurality of plaintext data bits; and
- a framer for placing said plaintext data bits into a plurality of transmit frames, said transmit frames also including a plurality of second flag bits and a plurality of second zero bits within said plaintext data bits inserted to avoid there being a sequence of said plaintext data bits coinciding with a sequence of said second flag bits.

13. A frame processing device in accordance with claim 12, wherein said means for receiving said data bits with a first data rate includes a network interface and said means for transmitting said data bits with a second data rate includes a host interface.

14. A frame processing device in accordance with claim 12, wherein said received frames and said transmit frames comprise frame relay frames.

15. A frame processing device in accordance with claim 4, wherein said underrun condition comprises said second data rate being greater than said first data rate and there being no said data bits in said FIFO buffer means for said output means to output and said overrun condition comprises said first data rate being greater than said second date rate and there being no room for more said data bits to be inputted into said FIFO buffer means.

16. A frame processing device in accordance with claim 4, wherein said frames of data bits comprises frames of bytes of said data bits and said watermark comprises a number of said bytes.

* * * * *